(12) United States Patent
Lambert et al.

(10) Patent No.: US 8,741,241 B2
(45) Date of Patent: *Jun. 3, 2014

(54) METHODS AND SYSTEMS FOR AN ENGINE EMISSION CONTROL SYSTEM

(71) Applicant: Ford Global Technologies, LLC, Dearborn, MI (US)

(72) Inventors: Christine Kay Lambert, Dearborn, MI (US); Douglas Allen Dobson, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,709

(22) Filed: Jul. 22, 2013

(65) Prior Publication Data

US 2013/0302232 A1 Nov. 14, 2013

Related U.S. Application Data

(63) Continuation of application No. 13/211,927, filed on Aug. 17, 2011, now Pat. No. 8,491,860.

(51) Int. Cl.
*B01D 53/94* (2006.01)
*B01J 35/00* (2006.01)
*F01N 3/10* (2006.01)
*F01N 3/28* (2006.01)

(52) U.S. Cl.
USPC ............... 423/213.2; 423/213.5; 423/213.7; 502/527.12; 502/527.13; 60/299

(58) Field of Classification Search
USPC ............ 423/213.2, 213.5, 213.7; 502/527.12, 502/527.13; 60/299
See application file for complete search history.

(56) References Cited

U.S. PATENT DOCUMENTS

| | | | |
|---|---|---|---|
| 6,167,696 B1 | 1/2001 | Maaseidvaag et al. | |
| 7,121,087 B2 | 10/2006 | Hotta et al. | |
| 7,181,903 B2 | 2/2007 | Yamato et al. | |
| 8,252,258 B2 | 8/2012 | Müller-Stach et al. | |
| 8,329,607 B2 | 12/2012 | Kazi et al. | |
| 8,491,860 B2 * | 7/2013 | Lambert et al. | 423/213.2 |
| 2008/0098729 A1 | 5/2008 | Toshioka et al. | |
| 2009/0257933 A1 * | 10/2009 | Chen et al. | 423/213.2 |
| 2010/0126150 A1 | 5/2010 | Choi | |
| 2010/0180582 A1 | 7/2010 | Mueller-Stach et al. | |
| 2011/0305612 A1 * | 12/2011 | Muller-Stach et al. | 423/212 |

* cited by examiner

*Primary Examiner* — Timothy Vanoy
(74) *Attorney, Agent, or Firm* — Julia Voutyras; Alleman Hall McCoy Russell & Tuttle LLP

(57) ABSTRACT

Systems and methods are provided for a layered emission control device coupled to an exhaust manifold. Various formulations may be incorporated in a plurality of layers of the device to enable various emission control functions to be grouped within spatial constraints. For example, a first layer may include a first, oxidizing catalyst, a second layer may include a HC trap, and a third layer may include a second, different oxidizing catalyst, the second layer positioned between the first and third layers. The layers may be organized to reduce functional interference and improve functional synergy between the various emission control functions.

20 Claims, 3 Drawing Sheets

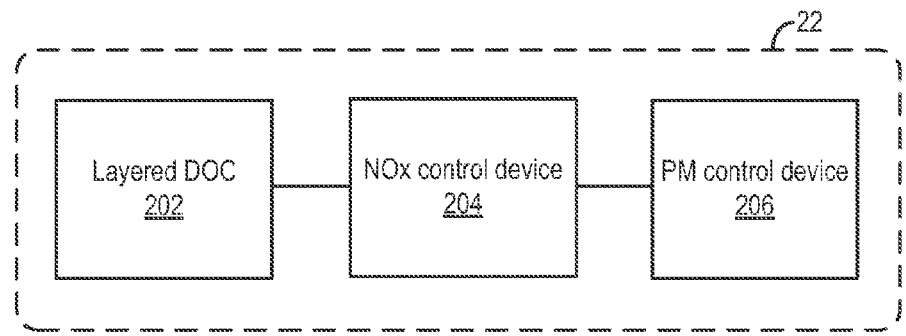
FIG. 2
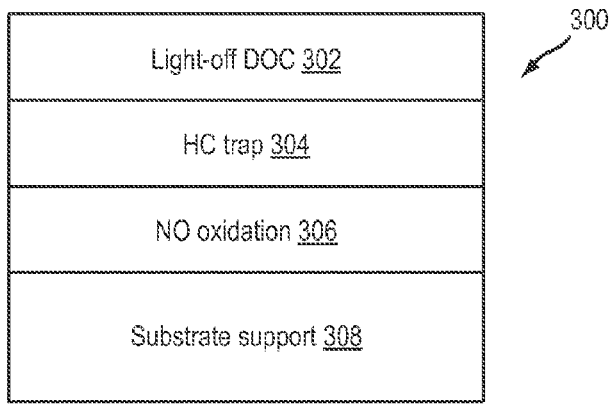
FIG. 3
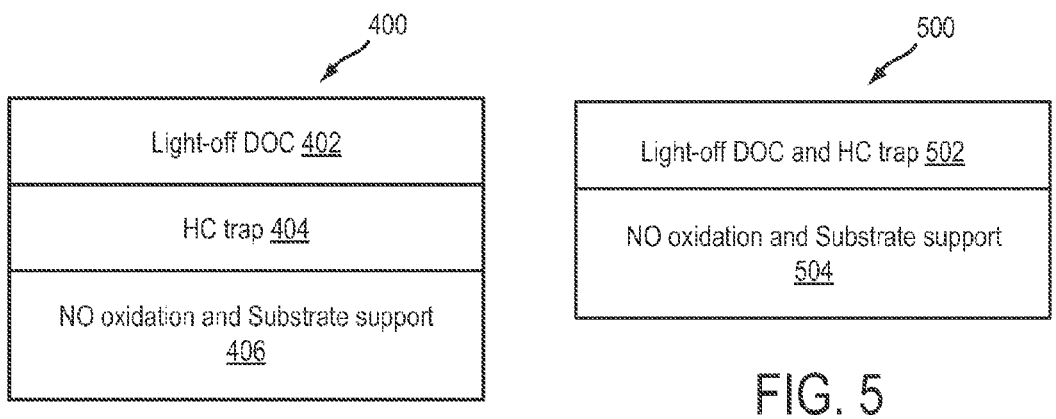
FIG. 4
FIG. 5

METHODS AND SYSTEMS FOR AN ENGINE EMISSION CONTROL SYSTEM

CROSS REFERENCE TO RELATED APPLICATIONS

The present application is a continuation of U.S. patent application Ser. No. 13/211,927, now U.S. Pat. No. 8,491,860, filed on Aug. 17, 2011, the entire contents of which are incorporated herein by reference for all purposes.

FIELD

The present application relates to methods and systems for emission control of a vehicle with a diesel oxidation catalyst having more than one catalytic environment.

BACKGROUND AND SUMMARY

In an effort to meet stringent federal emissions regulations, vehicle engines may be configured with an emission control system including various emission control devices, such as three-way catalysts, diesel oxidation catalysts, particulate filters, NOx catalysts, and hydrocarbon (HC) traps. The various emission control devices may be arranged in different configurations.

One example configuration is shown by Maaseidvaag et al. in U.S. Pat. No. 6,167,696. Therein, a three-way catalyst is included upstream of a HC trap, a NOx trap and an electrically heated catalyst. Another example configuration is shown by Yamato et al. in U.S. Pat. No. 7,181,903. Therein, a three-way catalyst is included downstream of a NOx trap and a plasma reactor containing a HC trap. Based on the specific configuration and order of the various emission control devices in the emission control system of '696 and '903, different control strategies (e.g., temperature control strategies) are used to coordinate their activities.

However, the inventors herein have identified potential issues with such systems. As one example, the various functions may compete and/or interfere with each other. For example, NO species may be oxidized to $NO_2$ by a diesel oxidation catalyst upstream of a NOx catalyst after an engine cold start. However, the hydrocarbon and carbon monoxide oxidizing function of the diesel oxidation catalyst may interfere with the NO oxidation function of the catalyst. As a result, even with different configurations, emissions compliance may not be achieved. This issue may be exacerbated as emissions regulations get more stringent while combustion processes become more efficient with significantly lower exhaust temperatures. As another example, the different configurations and the lower exhaust temperatures may complicate emission control device temperature control strategies. As still another example, due to packaging volume constraints on the vehicle, the space available for the different configurations and functionalities of the emission control system may be limited. Overall, exhaust emissions may be degraded.

In one example, some of the above issues may be at least partially addressed by a layered emission control system coupled to a vehicle engine exhaust manifold. In one embodiment, the layered system comprises a first, upper layer including a first, oxidizing catalyst, a second, intermediate layer including a HC trap for trapping exhaust HCs, and a third, lower layer including a second, different oxidizing catalyst. The second layer may be positioned between the first and third layers, and all the layers may be layered on, and supported by a substrate support. In this way, various formulations may be layered on a substrate in a selected order to enable various emission control functions to be grouped within spatial constraints to provide synergistic benefits.

For example, an exhaust emission control system may include a layered emission control device upstream of one or more NOx catalysts and particulate filters. In one example, the layered emission control device may be a layered diesel oxidation catalyst system wherein a plurality of layers are layered on, and supported by a substrate support. A first, upper layer may include a first, oxidizing catalyst, such as a diesel oxidation catalyst (DOC), for oxidizing exhaust hydrocarbons (HCs) and generating an exotherm for downstream particulate filters or HC traps. For example, exhaust HCs may be oxidized to periodically generate an exotherm, such as to assist in regeneration of a downstream particulate filter. A second, intermediate layer may include a HC trap for trapping exhaust HCs. A third, lower layer may include a second, different oxidizing catalyst for oxidizing exhaust NO species to $NO_2$ species. The exhaust $NO_2$ species may then be trapped or converted in a downstream NOx trap or NOx reducing catalyst. By retaining the exhaust HCs in the second layer, the NO oxidation reaction of the third layer may be protected from HC interference. In addition to a specified functionality, each layer may also have a specified washcoat loading and/or precious metal loading suited to the specific functionality of the layer. The loadings may also be based on the vehicle application and the specific emission profile. For example, in vehicles operating on fuels or calibrations that have a higher HC content in the exhaust gas during cold start, the device may be configured such that the capacity of the second layer having the HC trap is increased. As another example, in vehicles operating with lean-burn engines that have a higher NOx content in the exhaust gas, the device may be configured such that the capacity of the third layer is increased to improve $NO_2$ formation. In still further embodiments, one or more of the layers may be included within the substrate support, such as a highly porous substrate support, to reduce backpressure.

In this way, an emission control device may be configured with different formulations in the different layers to integrate various emission control functions and provide synergistic benefits. By reducing functional interference and improving functional synergy, the quality of exhaust emissions can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows a schematic depiction of the emission control system coupled to the engine system of FIG. 1.

FIGS. 3-5 show example embodiments of a layered emission control device.

DETAILED DESCRIPTION

Figure 1:
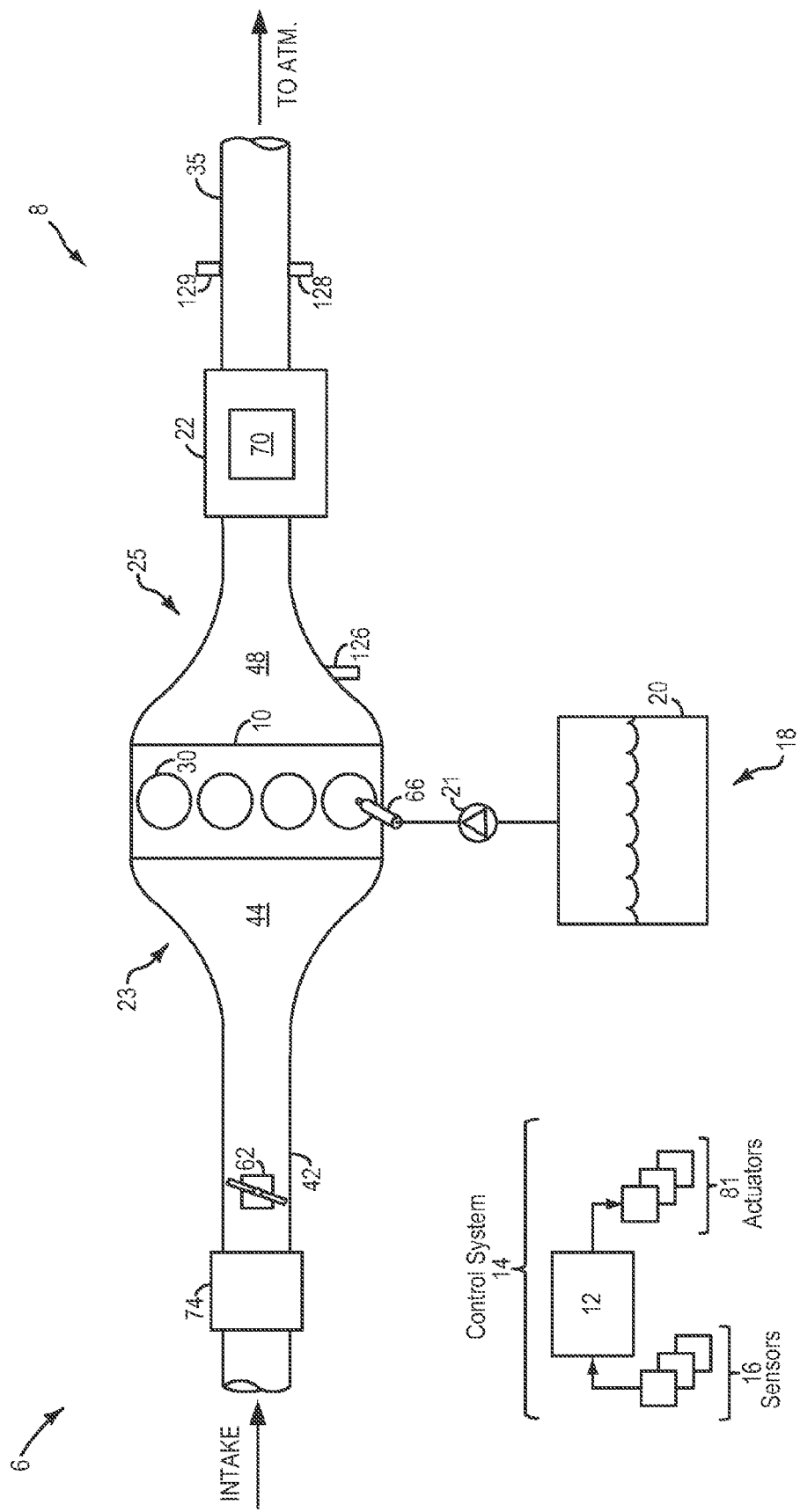
FIG. 1 shows a schematic depiction of an engine system.
Figure 6:
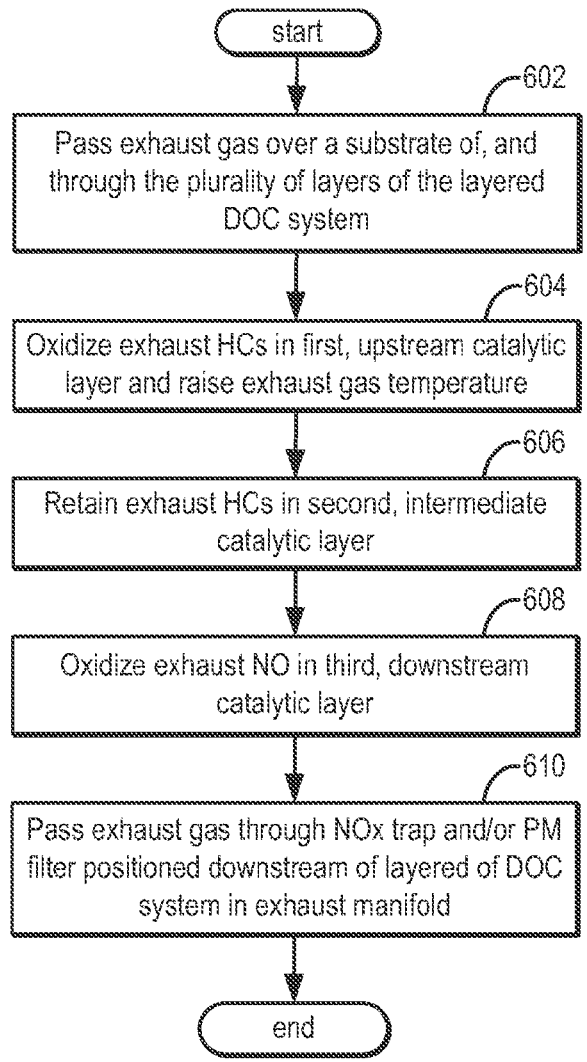
FIG. 6 shows a high level flow chart illustrating a routine for operating the layered emission control device of FIGS. 3-5.

The following description relates to systems and methods for a layered emission control device coupled to the exhaust manifold of an engine system, such as the engine system of FIG. 1. The layered emission control device may be a layered diesel oxidation catalyst (DOC) system, as shown in FIG. 2, positioned upstream of one or more other emission control devices, such as one or more NOx reducing catalysts and particulate matter (PM) filters coupled to the engine exhaust manifold. The various layers of the layered device may include different formulations for enabling different emission control functions to be performed within the spatial constraints of the device. The various formulations may be layered, as shown in FIGS. 3-5, so as to reduce functional interference while enabling functional synergies. As shown in FIG. 6, exhaust gas may be passed over and through the layered device to retain and oxidize exhaust hydrocarbons and raise the exhaust temperature, while oxidizing exhaust NO species to $NO_2$ for subsequent capture on a downstream NOx trap or low temperature reduction in a Selective Catalytic Reduction (SCR) catalyst that uses urea or other NOx reductant. In this way, the quality of exhaust emissions can be improved.

FIG. 1 shows a schematic depiction of an engine system 8 including an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. Engine exhaust 25 includes an exhaust manifold 48 leading to an exhaust passage 35 that routes exhaust gas to the atmosphere. Engine exhaust 25 includes an emission control system 22 having one or more emission control devices 70 mounted in a close-coupled position. The one or more emission control devices may include various combinations and arrangements (as shown in FIG. 2) of a layered diesel oxidation catalyst (described in FIGS. 3-5), three-way catalyst, lean NOx trap, SCR catalyst, diesel particulate filter, oxidation catalyst, etc. It will be appreciated that other components may be included in the engine such as a variety of valves and sensors.

In some embodiments, engine intake 23 may further include a boosting device, such as a compressor 74. Compressor 74 may be configured to draw in intake air at atmospheric air pressure and boost it to a higher pressure. The boosting device may be a compressor of a turbocharger, where the boosted air is introduced pre-throttle, or the compressor of a supercharger, where the throttle is positioned before the boosting device. Using the boosted intake air, a boosted engine operation may be performed.

Engine system 8 may be coupled to a fuel system 18 including a fuel tank 20 coupled to a fuel pump system 21. Fuel tank 20 may hold a plurality of fuel blends, including fuel with a range of alcohol concentrations, such as various gasoline-ethanol blends, including E10, E85, gasoline, etc., and combinations thereof. Fuel pump system 21 may include one or more pumps for pressurizing fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control system, temperature sensor 128, and pressure sensor 129. Other sensors such as additional pressure, temperature, air/fuel ratio, and composition sensors may be coupled to various locations in the vehicle system 6, as discussed in more detail herein. As another example, the actuators may include fuel injector 66, and throttle 62. The control system 14 may include a controller 12. The controller may receive input data from the various sensors, process the input data, and trigger the actuators in response to the processed input data based on instruction or code programmed therein corresponding to one or more routines. An example control routine is described herein with regard to FIG. 6.

FIG. 2 shows an example embodiment of emission control system 22. Emission control system 22 may include one or more emission control devices coupled to an engine exhaust manifold. These may include, for example, a layered diesel oxidation catalyst device (or system) 202 positioned upstream of a NOx control device 204 and a PM control device 206. The NOx control device may include, for example, a lean NOx trap (LNT) or a NOx reducing catalyst (e.g., an SCR catalyst), while the PM control device may include, for example, a PM filter or a diesel particulate filter (DPF). While the depicted embodiment shows the NOx control device 204 upstream of the PM control device 206, in alternate embodiments, the NOx control device 204 may be positioned downstream of the PM control device 206. By positioning the layered DOC device 202 upstream of the NOx control device and the PM control device, various advantages may be achieved. For example, exhaust hydrocarbons may be oxidized in one of the layers of the layered DOC device to raise the temperature of the exhaust gas above a threshold temperature, such as above a regeneration temperature of the PM device. As another example, exhaust hydrocarbons may be retained in one of the layers of the layered DOC device to reduce functional interference of the hydrocarbons with the NOx control device. In this way, by passing exhaust gas over (and through) the layered DOC device before passing the exhaust gas over the downstream NOx catalysts and PM filters, various exhaust components may be progressively processed and the quality of exhaust emissions may be improved.

While not depicted, a reducing agent delivery system may be included in emission control system 22, for example, upstream of the NOx control device. The reducing agent delivery system may be configured to inject an appropriate reducing agent (such as ammonia or urea) to the exhaust gas just before the exhaust enters the NOx control device.

Various embodiments of the layered diesel oxidation catalyst device (202) of FIG. 2 are illustrated herein at FIGS. 3-5. The various embodiments include embodiments wherein a plurality of layers with distinct formulations are layered on, and supported by, a substrate support, as well as embodiments wherein one or more formulations are included in the same layer and one or more layers are layered within the substrate support.

Turning to FIG. 3, a first embodiment 300 is shown of a layered emission control system, (such as the layered diesel oxidation catalyst system of FIG. 2) coupled to a vehicle engine exhaust manifold (such as the exhaust manifold of FIG. 1). The layered system may comprise a first, upper (or outer) layer 302 including a first, oxidizing catalyst. The first oxidizing catalyst may be, for example, a light-off diesel oxidation catalyst. The layered system may further comprise a second, intermediate layer 304 including a HC trap for trapping exhaust HCs. The layered system may also comprise a third, lower (or inner) layer 306 including a second, different oxidizing catalyst. For example, the second oxidizing catalyst may be a NO oxidation catalyst configured to oxidize exhaust NO species to $NO_2$ species. The second layer 304 may be positioned between the first and third layers 302, 304. The layered system may further comprise a substrate support 308. Specifically, the third layer 306 may be layered directly on (top of) the substrate support while the second layer 304 may be layered on (top of) the third layer and the first layer 302 may be layered on (top of) the second layer. Substrate support 308 may be of any suitable material such as cordierite, aluminum titanate, mullite or silicon carbide. Additionally, substrate support may have a porosity of 42 to 65%. In still other embodiments, the substrate support may comprise a diesel particular filter (DPF) including a plurality of channels with alternating ends blocked. As such various suitable particulate filters may be used including cordierite, aluminum titanate, mullite and silicon carbide.

The first oxidizing catalyst of the first layer 302 may be configured to oxidize exhaust HCs to raise an exhaust temperature above a threshold temperature. For example, the first oxidizing catalyst of the first layer may oxidize exhaust HCs to periodically generate an exotherm for downstream particulate filters or HC traps. In this way, exhaust heat may be maintained above a threshold required for the improved functioning of the downstream emission control devices, for example, for regeneration of a downstream particulate matter filter. Additionally, by including the HC oxidizing catalyst in one of the layers, the need for a dedicated light-off catalyst, or other exhaust heat maintaining device, may be reduced.

The second oxidizing catalyst of the third layer 306 may be configured to trap exhaust NOx species. For example, the second layer may have a microporosity that is configured to retain exhaust HC species in the second layer 304 and prevent the HCs from entering the third layer 306. At the same time, the second layer may be sized to enable exhaust NOx species to pass through the second layer into the third layer. In this way, the second layer including the HC trap may act as a molecular sieve filtering out large molecular weight HCs during lean-burn or low temperature conditions and protecting the NO oxidizing catalyst of the third layer from the detrimental thermal effects of HC adsorption. By incorporating the NO oxidizing catalyst within one of the layers, the need for a dedicated NO oxidation device, such as a plasma reactor, may be reduced. Additionally, the third layer may be configured to trap NOx species during engine cold-starts and thermally desorb the NOx species at normal operating temperatures of the emission control device.

In the depicted embodiment, only the light-off diesel oxidation catalyst may be included in the first layer, while the HC trap and the NO oxidizing catalyst are excluded from the first layer. In the same manner, only the HC trap may be included in the second layer while the first and second oxidizing catalysts are excluded from the second layer, and only the NO oxidizing catalyst may be included in the third layer, while the HC trap and the diesel oxidation catalyst are excluded from the third layer. In this way, the different functionalities may be limited to different layers to reduce functional interference while enabling synergy between the functions.

The various layers may be configured with different washcoat loadings. Additionally, the precious metal loading of the different layers may vary. For example, the first layer may have a first washcoat loading and a first precious metal loading, the second layer may have a second washcoat loading and a second precious metal loading, and the third layer may have a third washcoat loading and a third precious metal loading. The first, second, and third washcoat loadings and precious metal loadings may be selected based on the functionality of the layer. For example, some layers (e.g., the first DOC layer) may include a higher precious metal loading while other layers (e.g., the third NO oxidizing layer) may not include any precious metals. Additionally, the loadings may be tailored to a specific vehicle application and a specific exhaust emission profile of the engine. In still further embodiments, the washcoat and precious metal loadings may be adjusted based on the engine out HC content. In one example, the total washcoat loading may be in the range of 1.25 to 4.5 $g/in^3$ with different washcoat loading distributions for the different layers.

As one example, the washcoat loading of first layer 302 including the diesel oxidation catalyst may be 0.25 to 1.5 $g/in^3$. The first layer 302 may also have a precious metal loading with a platinum (Pt) and palladium (Pd) content of 2 to 180 $g/ft^3$. The ratio of Pt to Pd may be in the range of 2:1 to 0:1. In one example, the Pt to Pd ratio may be 1:4.

The washcoat loading of second layer 304 including the HC trap may be 0.5 to 1.5 $g/in^3$. The second layer 304 may further include zeolite material of an appropriate family including aluminosilicates and silicoaluminophosphates (SAPOs). That is, in the embodiment of FIG. 3, the first and third layers may not include zeolite material. The zeolite material of the second layer 304 may further include ion-exchanged metals such as Ag, Au, Cu, Fe and/or other metals known to promote HC adsorption. The washcoat loading of third layer 306 including the NO oxidation catalyst may be 0.5 to 1.5 $g/in^3$. The third layer 306 may be configured to not include any Pt group metals. Rather, the third layer may include mixed metal oxides. Specifically, the third layer may include a single metal oxide or mixtures in a range of 2 to 20 weight % within the layer. In one example, the mixed metal oxides may include Mn or Co primary. In another example, the mixed metal oxides may include W and Mo secondary, or Cu and Fe tertiary.

FIG. 4 shows an alternate embodiment 400. Herein, the layered diesel oxidation catalyst (DOC) system comprises a first DOC layer 402 configured to oxidize exhaust hydrocarbons to raise an exhaust temperature, and a second DOC layer 404 configured to trap exhaust hydrocarbons and not allow them to pass into the substrate support. In the depicted embodiment, the DOC system comprises a substrate support 406 that has a higher porosity (e.g., higher than a threshold). The high porosity substrate support may have a porosity of 40 to 80%. The high porosity variety of substrate support 406 may include, for example, high porosity cordierite, or silicon carbide, as in the high porosity substrate support of the previous embodiments. Further still, the high porosity substrate may include a high porosity DPF substrate having a porosity in the range of 40 to 80%.

Use of such a high porosity substrate support may enable an additional catalyst, or formulation, to be incorporated within the substrate support. For example, as depicted, a third layer including the second, NO oxidizing catalyst may be included within substrate support 406 while the first and second DOC layers 402, 404 are supported by the substrate support 406. By including at least one of the layers within the substrate support, further compaction within spatial constraints can be achieved while also reducing an exhaust back-pressure experienced in the layered emission control device. Additionally, attainment of a light-off temperature may be expedited. The washcoat loading of the different layers as well as the precious metal content of the different layers of the embodiment of FIG. 4 may be similar to those discussed previously with reference to the embodiment of FIG. 3.

FIG. 5 shows yet another embodiment 500. Herein, the layered diesel oxidation catalyst (DOC) system comprises a first DOC layer 502 configured to trap and oxidize exhaust hydrocarbons. That is, the first and second layers of the embodiments of FIGS. 3-4 are merged or included one within the other to provide synergistic benefits. In this first merged layer, exhaust HC may be trapped, and the trapped exhaust HCs may be oxidized by the first oxidation catalyst to raise an exhaust temperature and periodically generate an exotherm for downstream emission control devices. The layered system may further include a second DOC layer 504 comprising a substrate support (e.g., a high porosity substrate support) within which the second, NO oxidizing catalyst is layered, as previously shown in FIG. 4. In other words, the second layer is included in the substrate support. Therefore in the embodiment of FIG. 5, only the first layer may include zeolite and Pt group metals (that is, the second layer may not include zeolites or Pt group metals) while only the second layer may include mixed metal oxides (that is, the first layer may not include mixed metal oxides).

With reference to the embodiment of FIG. 5, the total washcoat loading may remain in the range of 1.25 to 4.5 g/in$^3$ with the specifications of the light-off catalyst, the HC trap, and the NO oxidation catalyst remaining the same as those previously indicated at FIG. 3. However, the washcoat loading distribution between the layers may vary. In one example, the washcoat loading of the first merged layer having the first HC oxidation catalyst function and the HC trap function may be 0.75 to 2.5 g/in$^3$ while the washcoat loading of the second layer having the substrate support and the NO oxidation catalyst may be 0.5 to 2 g/in$^3$.

In each of the embodiments of FIGS. 4-5, the first DOC, or first layer, is configured to load a first amount of exhaust hydrocarbons, while the second DOC, or second layer is configured to load and oxidize a second amount of exhaust NOx species and potentially trap NOx during cold start. In one example, the second amount of loading may be larger than the first amount of loading. In an alternate example, the second amount may be lower than the first amount of loading. The layers may also differ in their qualitative composition. For example, the first DOC layer may include precious metals like platinum and/or palladium, while the second DOC layer may include a base metal such as manganese, without such precious metals.

It will be appreciated that while the embodiments of FIGS. 3-5 depict the different formulations as different layers layered on a substrate support, in alternate embodiments, the different formulations may be included on distinct substrates, or bricks. As such, by layering the different functionalities, spatial constraints may be better met without comprising functional efficiency.

Now turning to FIG. 6, an example method 600 of operating an upstream layered emission control device and one or more other downstream emission control devices coupled to an engine exhaust manifold is shown. By passing exhaust gas through the layered emission control device before passing the exhaust gas through the other emission control devices, additional exhaust processing can be achieved within the spatial constraints of the exhaust manifold while also reducing functional interferences.

At 602, the routine includes passing exhaust gas over a substrate of the layered device (such as the layered DOC system) and through a plurality of catalytic layers supported by the substrate. At 604, the routine includes oxidizing exhaust hydrocarbons in a first, upstream catalytic layer of the device. Herein, by oxidizing exhaust hydrocarbons in the first layer, a temperature of the exhaust gas may be raised above a threshold temperature, such as regeneration temperature of the PM filter. That is, a periodic exotherm may be generated for heat maintenance in the exhaust system, thereby improving the performance of the downstream emission control devices.

At 606, the routine includes retaining exhaust hydrocarbons in a second, intermediate catalytic layer of the device. By retaining the exhaust HCs in the second layer, the catalytic activity of the third, lower layer may be protected from HC interference. At 608, the routine includes oxidizing exhaust NO species in a third, downstream catalytic layer of the device. Specifically, exhaust NO may be oxidized to NO$_2$ for subsequent retention and processing in a downstream NOx trap or continuous reduction by an SCR catalyst. As such, in embodiments of the device wherein the substrate is of a higher porosity variety and the NO oxidizing catalyst of the third layer is included in the substrate, oxidizing exhaust NO species in the third layer may include oxidizing exhaust NO species within the substrate support. After passing the exhaust gas over the substrate and plurality of layers of the layered device, at 610, the routine may include passing the exhaust gas through one or more of a NOx trap or SCR catalyst and a PM filter positioned downstream of the substrate in the exhaust manifold.

In this way, various emission control functions and formulations may be layered on a substrate support to integrate the various emission control functions within the packaging volume constraints of a vehicle engine exhaust manifold. By organizing the configuration of the layers to increase synergistic benefits while reducing functional interference, the quality of exhaust emissions can be improved.

It will be appreciated that the configurations and process flows disclosed herein are exemplary in nature, and that these specific embodiments are not to be considered in a limiting sense, because numerous variations are possible.

The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
    a vehicle engine exhaust; and
    a layered emission control system coupled to a vehicle engine exhaust manifold, comprising a first, upper layer including a first, oxidizing catalyst, a second, intermediate layer including a HC trap for trapping exhaust HCs, and a third, lower layer including a second, different oxidizing catalyst, wherein the second layer is positioned between the first and third layers.

2. The system of claim 1, wherein the first oxidizing catalyst is configured to oxidize exhaust and the second oxidizing catalyst is configured to oxidize and/or trap exhaust NOx species.

3. The system of claim 1, wherein the second layer has a porosity that is configured to retain exhaust HC species in the second layer and enable exhaust NOx species to pass through the second layer into the third layer.

4. The system of claim 1, wherein the second layer includes a zeolite.

5. The system of claim 1, wherein only the second layer includes a zeolite.

6. The system of claim 1, wherein the first layer further includes a diesel oxidation catalyst and the second layer includes a zeolite with a washcoat loading of 0.5 to 1.5 g/in$^3$.

7. The system of claim 1, wherein the first layer has a first washcoat loading and precious metal content, the second layer has a second washcoat loading and precious metal content, and the third layer has a third washcoat loading and precious metal content, wherein the first loading is different from each of the second and third loadings, and wherein the first content is different from each of the second and third contents.

8. The system of claim 1, further comprising a substrate support.

9. The system of claim 8, wherein the third layer is layered on the substrate support.

10. The system of claim 9, wherein the substrate support has a porosity that is higher than a threshold, and wherein the third layer is included within the substrate support.

11. A layered diesel oxidation catalyst (DOC) system, comprising:
- a first DOC layer configured to trap exhaust hydrocarbons and/or oxidize exhaust hydrocarbons to raise an exhaust temperature;
- a second DOC layer configured to trap exhaust NOx species and/or oxidize exhaust NO; and
- an intermediate layer, positioned between the first and second DOC layers, including a zeolite HC trap comprising silicoaluminophosphates.

12. The system of claim 11, further comprising a substrate support, wherein the first and second DOC layers are supported by the substrate support.

13. The system of claim 12, wherein a PM filter is positioned downstream of the layered diesel oxidation catalyst.

14. The system of claim 11, wherein the first layer includes zeolites and the second layer does not include zeolites.

15. The system of claim 11, wherein each of the first and second layers include a DOC.

16. The system of claim 11, wherein the first layer includes Pt and/or Pd, and wherein the second layer does not include Pt or Pd.

17. A method, comprising: operating an emission control device coupled downstream of an engine exhaust manifold, including:
- passing exhaust gas over a substrate of the device and through a plurality of catalytic layers supported by the substrate;
- oxidizing exhaust hydrocarbons in a first, top catalytic layer of the device;
- retaining exhaust hydrocarbons in a second, intermediate catalytic layer of the device; and
- oxidizing exhaust NO species in a third, bottom catalytic layer of the device.

18. The method of claim 17, further comprising, after passing the exhaust gas over the substrate of the device, passing the exhaust gas through one or more of a NOx trap, NOx reducing catalyst, and a PM filter positioned downstream of the substrate in the exhaust manifold.

19. The method of claim 18, wherein oxidizing exhaust hydrocarbons in the first layer includes raising a temperature of the exhaust gas above a regeneration temperature of the PM filter.

20. The method of claim 17, wherein the substrate has a porosity and the third layer is included in the substrate, such that oxidizing exhaust NO species in the third layer includes oxidizing exhaust NO species in the substrate.

* * * * *